Patented Nov. 10, 1953

2,658,905

UNITED STATES PATENT OFFICE 2,658,905

2-(N-ARYLETHYL-ALKYLAMINOMETHYL)-FURANES

Karl Hoffmann, Binningen, and Max Spillmann, Basel, Switzerland, assignors to Ciba Pharmaceutical Products, Inc., Summit, N. J.

No Drawing. Application March 17, 1952, Serial No. 277,064

Claims priority, application Switzerland March 22, 1951

5 Claims. (Cl. 260—340.5)

The present invention relates to 2-(N-arylethylalkylaminomethyl)-furanes of the formula

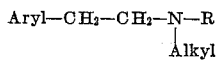

and salts thereof. In the above formula R represents a saturated or unsaturated furyl-(2)-methyl residue.

In particular, the present invention relates to compounds of the above formula wherein Aryl stands for a phenyl residue with etherified hydroxyl groups such as lower alkoxy or lower alkylenedioxy groups, Alkyl represents a lower alkyl residue as methyl, ethyl or propyl radicals, and R a tetrahydrofuryl-(2)-methyl residue, primarily the 2 - [N - (3',4' - methylenedioxy - phenylethyl) - methylamino - methyl] - tetrahydrofurane of the formula

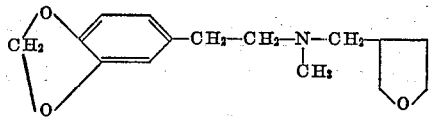

and salts thereof.

The new furane compounds exhibit a specific action against disturbanes in the rhythm of the heart. On the isolated mammalian heart the compounds inhibit fibrillation provoked by aconitin. In cats, fibrillation of the heart provoked by chloroform and epinephrine or cyclopropane and epinephrine is also suppressed by these compounds. They are useful as medicaments.

The aforesaid compounds may be obtained by various methods, thus for example, by reacting an arylethyl-halide with a 2-alkylaminomethylfurane or an N-metal derivative thereof, such as an N-alkali metal compound.

An alternative method of procedure consists in reacting a 2-[arylethyl-aminomethyl]-furane or an N-metal derivative thereof, such as an N-alkali metal compound, with an alkylhalide. Alternatively, an amine of the aforesaid kind may be condensed with an alkanal and reduced.

A still further mode of procedure consists in reacting an N-arylethyl-alkylamine with a furyl-(2)-methylhalide.

In the foregoing description the terms "furyl" and "furane" used in defining the starting materials are intended to include saturated and unsaturated furane compounds.

The reactions referred to above may be carried out in the absence or presence of a diluent and/or a condensing agent and/or a catalyst. As diluents there may be used, for example, alcohol, ethyl acetate, dioxane, benzene, toluene, nitrobenzene, or thiodichlorobenzene or the like. Those starting materials which are not known can be made by methods in themselves known, as will hereinafter appear.

The new compounds are obtained in the form of their free bases or salts depending on the method used. From the free bases salts with inorganic or organic acids can be prepared in the usual manner for example with a hydrohalic acid such as hydrochloric acid, sulphuric acid, phosphoric acid, nitric acid, methane-sulphonic acid, hydroxy-ethane-sulphonic acid, toluene-sulphonic acid, acetic acid, tartaric acid, citric acid or benzoic acid, whereby the corresponding hydrohalide such as the hydrochloride, sulphate, phosphate, nitrate, methane-sulphonate, hydroxyethane - sulphonate, toluene - sulphonate, acetate, tartrate, citrate or benzoate is produced.

The following examples illustrate the invention, the parts and percentages being by weight. Temperatures are in degrees centigrade.

*Example 1*

7.5 parts of N-[tetrahydrofuryl-(2)-methyl]-2',3',4'-trimethoxy-phenylethylamine are heated with 2 parts of formic acid of 90 per cent strength and 3 parts of formaldehyde solution of 40 per cent strength for 3 hours at 90–100°. The solution is then cooled and diluted with 2N-hydrochloric acid and then extracted with ether, separated, rendered alkaline with aqueous caustic soda solution and extracted with ether. From the ethereal solution there is obtained by drying and distillation 2-[N-(2',3',4'-trimethoxy-phenylethyl) - methylamino - methyl] - tetrahydrofurane of the formula

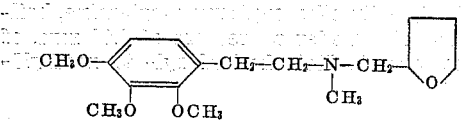

boiling at 140–142° under a pressure of 0.15 mm. of mercury. Its hydrochloride melts at 113–114°.

*Example 2*

By the method described in Example 1, there is obtained from 13 parts of N-[furyl-(2)-methyl]-3',4'-methylenedioxy-phenylethylamine, 3.8 parts of formic acid of 90 per cent strength and 5.6 parts of formaldehyde solution of 40 per cent strength, 2-[N-(3',4' - methylenedioxy - phenylethyl)-methylamino-methyl]-furane boiling at 130–131° under a pressure of 0.1 mm. of mercury. The product has the formula

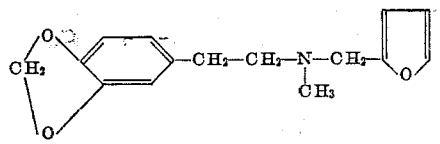

Example 3

7 parts of N-[tetrahydrofuryl-(2)-methyl]-2',3'-dimethoxy-phenylethylamine are worked up in the manner described in Example 1 to yield 2 - [N - (2',3' - dimethoxyphenylethyl) - methyl-amino-methyl]-tetrahydrofurane of the formula

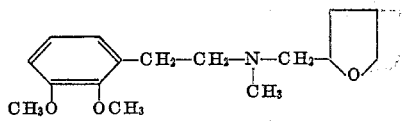

which boils at 131–133° under a pressure of 0.15 mm. of mercury.

Example 4

13 parts of N - [furyl-(2)-methyl]-2',3'-dimethoxy-phenylethylamine are methylated by the method described in Example 2 to yield 2-[N-(2',3'-dimethoxy-phenylethyl)-methylamino-methyl]-furane of the formula

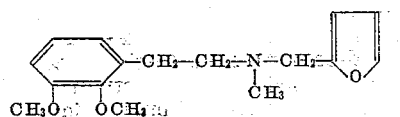

in the form of a yellowish oil boiling at 130–132° under a pressure of 0.1 mm. of mercury.

Example 5

12.5 parts of N-[tetrahydrofuryl-(2)-methyl]-3',4'- methylenedioxy - phenylethylamine are methylated by the method described in Example 2 to yield 2 - [N-(3',4'-methylenedioxy-phenylethyl) - methylamino-methyl]-tetrahydrofurane. The product boils at 130–131° under a pressure of 0.15 mm. of mercury and has the formula

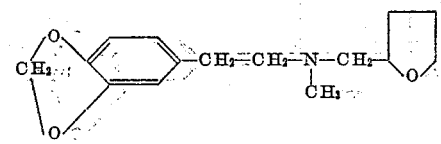

its hydrochloride melts at 138–139°, and the oxalate at 139–140°.

The starting materials used in the foregoing Examples 1, 3 and 5, namely: N-[tetrahydrofuryl-(2)-methyl]-2',3',4'-trimethoxy-phenylethylamine, boiling at 148–150° under a pressure of 0.1 mm. of mercury, N-[tetrahydrofuryl-(2)-methyl]-2',3'-dimethoxy-phenylethylamine, boiling at 136–138° under a pressure of 0.08 mm. of mercury, and N-[tetrahydrofuryl-(2)-methyl]-3',4'-methylenedioxy-phenylethylamine, boiling at 136–137° under a pressure of 0.1 mm. of mercury, are prepared by heating for 2 hours two molecular proportions of the appropriately substituted phenylethylamine with one molecular proportion of tetrahydrofuryl-methyl chloride, or by condensing 1 molecular proportion of phenylethylamine with 1 molecular proportion of tetrahydrofuryl-methylbromide in the presence of potassium bicarbonate.

The starting materials used in Examples 2 and 4, namely: N-[furyl-(2)-methyl]-3',4'-methylenedioxy-phenylethylamine and N-[furyl-(2)-methyl]-2',3'-dimethoxy-phenylethylamine are prepared by condensing furfurol with the appropriate phenylethylamine ether, followed by catalytic reduction of the Schiff's base so obtained.

What is claimed is:

1. A member selected from the group consisting of 2-(N-arylethyl-alkylaminomethyl)-furanes of the formula

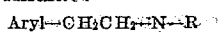

and their acid addition salts, wherein aryl is a radical selected from the group consisting of lower alkoxyphenyl and lower alkylenedioxyphenyl, and R is a radical selected from the group consisting of tetrahydrofuryl-(2)-methyl and furyl-(2)-methyl.

2. 2-[N - (3',4'-methylenedioxy-phenylethyl) - methylamino-methyl] - tetrahydrofurane, which is represented by the formula

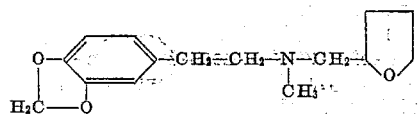

3. An acid addition salt of the compound of claim 2.

4. The 2 - [N - (3',4' - methylenedioxyphenylethyl) - methylamino-methyl]-tetrahydrofurane-hydrochloride which is represented by the formula

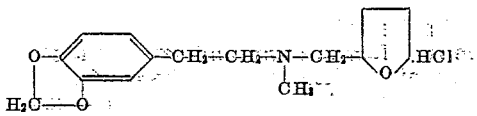

5. The 2 - [N - (3',4' - methylenedioxyphenylethyl)-methylamino-methyl]-tetrahydrofurane-oxalate which is represented by the formula

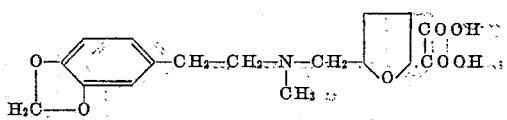

KARL HOFFMANN.
MAX SPILLMANN.

No references cited.